(12) United States Patent
Pakulski

(10) Patent No.: US 8,183,185 B2
(45) Date of Patent: May 22, 2012

(54) WELL SERVICING FLUID COMPRISING AN ORGANIC SALT BEING THE PRODUCT OF AN ORGANIC ACID AND AN ORGANIC AMINE BASE AND METHOD OF SERVICING A WELL WITH THE FLUID

(75) Inventor: Marek K. Pakulski, The Woodlands, TX (US)

(73) Assignee: Baker Hughes Incoporated, Houston, TX (US)

( * ) Notice: Subject to any disclaimer, the term of this patent is extended or adjusted under 35 U.S.C. 154(b) by 1 day.

(21) Appl. No.: 12/898,452

(22) Filed: Oct. 5, 2010

(65) Prior Publication Data

US 2012/0083430 A1    Apr. 5, 2012

(51) Int. Cl.
*C09K 8/00* (2006.01)
*E21B 43/00* (2006.01)

(52) U.S. Cl. .................. 507/241; 166/244.1; 166/305.1; 507/203; 507/239; 507/267; 507/269; 507/277

(58) Field of Classification Search .................. 507/241, 507/203, 239, 267, 269, 277; 166/244.1, 166/305.1
See application file for complete search history.

(56) References Cited

U.S. PATENT DOCUMENTS

| | | | |
|---|---|---|---|
| 5,741,758 A | 4/1998 | Pakulski | |
| 6,025,302 A | 2/2000 | Pakulski | |
| 6,331,508 B1 | 12/2001 | Pakulski | |
| 6,596,150 B2 * | 7/2003 | Nishino et al. | 205/153 |

FOREIGN PATENT DOCUMENTS

WO    WO9412761    6/1994

OTHER PUBLICATIONS

"Diamines", Publisher: Wikipedia; http://en.wikipedia.org/wiki/Diamines No Date, printed Aug. 30, 2010.*
SPE 106162, Successful Breaker Optimization for Polyacrylamide Friction Reducers Used in Slickwater Fracturing; P.S. Carman, SPE, and K.E. Cawiezel, copyright 2007.
Ethoxylated diamines, Ethoduomeen, Lionakzo Co.: http://www.lionakzo.co.jp/e/prod/p/33eudo_e.htm, printed Oct. 6, 2010.
"Ethoxylated Tallow Alkyl Amines (Ethomeen T)," Publisher: Chemical Land: http://chemicalland21.com/specialtychem/perchem/ETHOXYLATED%20TALLOW%20.., downloaded Aug. 26, 2010.
"Hypophosphorous acid", Publisher: Wikipedia; http://en.wikipedia.org/wiki/Phosphinic_acid, printed Aug. 26, 2010.
JACAAB, LLC, "Jacaab-Ethomeen T/15 Material Safety Data Sheet # J00530660_05262005", May 26, 2005, printed Oct. 6, 2010.
Huntsman International, LLC, Technical Bulletin for "Jeffamine D-230 amine Epoxy Curing Agent", Feb. 2008.
Huntsman International, LLC, "The JEFFAMINE Polyetheramines", May 2007.
Huntsman International LLC, "JEFFCAT catalysts", Copyright 2010.
"JJEFFCAT Amine Catalyst for Urethene Industry", Publisher: Idlong Chemical: http://ildongchem.com/eng/e_juc.htm, printed Aug. 27, 2010.
"Organophosphate" Publisher: Wikipedia: http://en.wikipedia.org/wiki/Organophosphate, printed Jun. 21, 2010.
"Phosphonate", Publisher: Wikipedia; http://en.wikipedia.org/wiki/Phosphonate, printed Oct. 6, 2010.
"Phosphorus oxoacids", Publisher: Wikipedia: http://en.wikipedia.org/wiki/Phosphorus_oxoacids printed Aug. 26, 2010.
"Polyamine", Publisher: Wikipedia: http://en.wikipedia.org/wiki/Polyamine, printed Aug. 30, 2010.
"Sulfonic acid", Publisher: Wikipedia; http://en.wikipedia.org/wiki/Sulfonic_acid, printed May 12, 2010.

* cited by examiner

*Primary Examiner* — Timothy J. Kugel
(74) *Attorney, Agent, or Firm* — Parsons Beble & Latimer

(57) ABSTRACT

A well servicing fluid is disclosed. The well servicing fluid is formulated with components comprising: an organic salt, the organic salt being the product of an organic acid and an organic amine base; and an aqueous based solvent. A method of servicing a well is also disclosed.

35 Claims, 1 Drawing Sheet

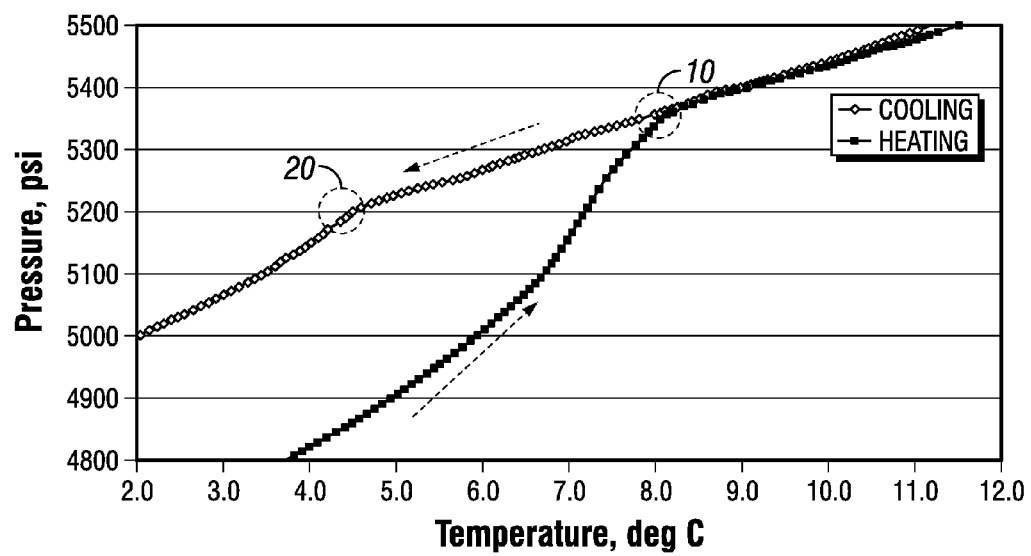

WELL SERVICING FLUID COMPRISING AN ORGANIC SALT BEING THE PRODUCT OF AN ORGANIC ACID AND AN ORGANIC AMINE BASE AND METHOD OF SERVICING A WELL WITH THE FLUID

FIELD OF THE DISCLOSURE

The present disclosure relates generally to well servicing fluids used in hydrocarbon producing wells, and more particularly to hydrate protected well servicing fluids.

BACKGROUND

Well servicing fluids, such as completion fluids or packer fluids, are often salt brines with various concentrations of organic solvents. These fluids can be designed to have a specific density so as to balance the weight of the completion or packer fluid column with the well formation pressure. If the fluid is too heavy, the fluid can sink into the well, possibly plug up the formation and may be difficult to recover. In order to form well servicing fluids having a fluid density that will be balanced with respect to the formation pressure, it is often desirable to employ low density fluids as a component of, for example, the well completion fluid.

In addition to being balanced, it is desirable that well servicing fluids also be protected against gas hydrates. The formation of hydrates in well servicing fluids is a well known problem. Gas hydrates are crystalline compounds that occur when water forms a cage-like structure around guest molecules, particularly gaseous molecules. In the petroleum industry, gas hydrates pose particular problems with respect to producing, transporting, and processing of natural gas in petroleum fluids. Typical gas hydrates formed in petroleum producing and transporting environments are composed of water and one or more guest molecules such as methane, ethane, propane, isobutane, normal butane, isopentane, normal pentane, nitrogen, carbon dioxide, and hydrogen sulfite. It is also known that other guest molecules such as ethylene, nitrous oxide, acetylene, vinyl chloride, ethyl bromide, oxygen, etc., can also form hydrates.

A number of solutions are known for reducing gas hydrates. For example, high concentration salt solutions can be very efficient thermodynamic hydrate inhibitors. While these salts can be useful for preventing the formation of hydrates under some conditions, the increased brine concentrations also generally increase the density of the fluid. This can cause the fluid to become undesirably overbalanced, making it unsuitable for some well applications.

In ultra-deep offshore waters, low density completion and/or packer fluids are often used. The low density fluids are generally designed to avoid damaging oil and gas bearing formations and to not impede future gas or oil output from the well. In a typical deepwater oil/gas well, such fluids must function under significant pressures and low mudline temperatures. Such conditions create a favorable environment for the formation of gas hydrates plugs in the low density completion or packer fluids.

One known solution for providing a low density fluid that is resistant to hydrate formation is to use various low density alcohols, which can shift hydrate formation toward lower temperature and higher pressure conditions. For example, methanol, ethanol, glycols, glycol ethers and polyglycols are well known thermodynamic hydrate inhibitors. These additives thermodynamically destabilize hydrates and effectively lower the temperature of hydrate formation. Conventionally, a large quantity of alcoholic solvent is added into a low density brine to achieve the desired gas hydrate inhibition properties under extreme conditions, such as deepwater oil/gas well completions. The addition of such alcoholic solvents inevitably increases complexity of fluid placement and causes greater safety and environmental concerns. This is at least in part due to the highly flammable and potentially explosive nature of alcohols, such as methanol and ethanol. Significant cost increase is also often associated with the use of alcoholic solvents in such situations.

Another known solution for reducing problems caused by hydrates is to use crystal growth inhibitors to inhibit the formation of the gas-hydrate crystals and/or the agglomeration of the gas hydrate crystallites to avoid forming crystalline masses sufficiently large to cause plugging. Examples of well known crystal growth inhibitors include surface active agents such as phosphonates, phosphate esters, phosphonic acids, salts and esters of phosphonic acids, inorganic polyphosphates, salts and esters of inorganic polyphosphates, polyacrylamides, and polyacrylates.

It is also known that poly-N-vinyl-2-pyrrolidone (PVP), which is a well-known water-soluble polymer, is effective, in relatively low concentrations, in interfering with the growth of gas-hydrate crystals. WO94/12761, published Jun. 9, 1994, discloses other additives for inhibiting crystal growth and controlling the formation of gas hydrates in fluid mixtures such as are encountered in the hydrocarbon industry in the production, transportation, and processing of petroleum and natural gas fluids. The crystal growth inhibitors are often called kinetic hydrate inhibitors (KHI). They are applied at low concentrations and prevent hydrate formation for a limited time, normally not beyond a few days. Thus, KHI are generally not used if the fluid has to be protected from hydrates for a longer period of time.

Completion fluids have also been protected from hydrate formation with combinations of inorganic salts and organic solvents. However, metal salt and glycol solutions that are effective against hydrates are heavy and often result in an overbalanced fluid that is too heavy and would be lost in the hydrocarbon producing formation.

The fluids of the present disclosure may provide improvements related to one or more of the problems with conventional well servicing fluids.

SUMMARY

An embodiment of the present disclosure is directed to a well servicing fluid. The well servicing fluid comprises: an organic salt, the organic salt being the product of an organic acid and an organic amine base; and an aqueous based solvent. The organic salt and the aqueous based solvent form an organic salt solution.

Another embodiment of the present disclosure is directed to a method of servicing a well. The method comprises providing a well servicing fluid comprising: an organic salt, the organic salt being the product of an organic acid and an organic amine base; and an aqueous based solvent. The organic salt and the aqueous based solvent form an organic salt solution. The well servicing fluid is introduced into the well.

BRIEF DESCRIPTION OF THE DRAWINGS

FIG. 1 is a graph showing pressure and temperature data, as described in the Examples below.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present disclosure is directed to forming relatively low density well servicing fluids that can be employed in hydrocarbon producing wells and production equipment. The well servicing fluids comprise an organic salt solution. The organic salt is the product of an organic acid and an organic amine base. The organic salt is specifically chosen to form low density fluids when combined with an aqueous based solvent. The well servicing fluids may also comprise other optional ingredients, as will be discussed in greater detail below.

Acids

The acids employed to make the organic salts of the well servicing fluids of the present disclosure will now be described. The acids can be any suitable organic acid that is capable of reacting with the chosen organic amine base to provide an aqueous fluid of the desired density. In an embodiment, the acids can be oxoacids of carbon, oxoacids of sulfur and oxoacids of phosphorus.

For example, the organic acids can be chosen from the compounds of general formula 1:

$$R^1X_y \qquad (1)$$

wherein:

$R^1$ is chosen from substituted or unsubstituted aliphatic groups and substituted or unsubstituted aromatic groups;

X is chosen from —C(=O)OH, —OS(=O)$_2$OH, —S(=O)$_2$OH, —OP(=O)(OR$^2$)OH, —P(=O)(OR$^2$)OH, and —P(=O)OHR$^2$, where $R^2$ is chosen from hydrogen atoms, substituted or unsubstituted aliphatic groups and substituted or unsubstituted aromatic groups; and y is 1 to 4.

Examples of suitable organic acids of Formula 1 include carboxylic acids, including mono and polycarboxylic acids. In an embodiment, the carboxylic acids can have the formula R'COON, where R' is a $C_1$ to $C_{12}$ alkyl group, such as propionic acid and acetic acid. Other examples of carboxylic acids include dicarboxylic acids, such as malonic, succinic, malic, oxalic and tartaric acids; polyacids such as citric acid, nitrilotriacetic acid and ethylenediamine tetraacetic acid (EDTA); and carboxylic acids that have unsaturated or aromatic hydrocarbon moieties, such as maleic acid and phthalic acid.

Still other suitable acids include sulfonic acids, such as dodecylbenzenesulfonic acid; and sulfuric acids, phosphoric acids, phosphonic acids, and phosphinic acids. Each of the sulfuric, phosphoric, phosphonic and phosphinic acids comprise at least one organic moiety, such as an alkyl group, alkenyl group, aryl group, alkoxyalkyl group or a carbonyl substituted alkyl group or other aliphatic or aromatic groups.

Bases

The base can be any suitable organic amine base that is capable of reacting with the chosen acid to form an organic salt that, when in solution in the aqueous based solvent, results in an aqueous solution of the desired density. Primary, secondary and tertiary amines can be used as the organic amine base.

For example, the organic amine base can be chosen from the compounds of formula 2:

$$R^3R^4R^5N \qquad (2)$$

where $R^3$, $R^4$ and $R^5$ are chosen from hydrogen atoms, hydroxyl groups, and substituted or unsubstituted aliphatic groups, with the proviso that at least one of $R^3$, $R^4$ and $R^5$ is an aliphatic group comprising from 1 to 40 carbons.

In an embodiment, at least one of $R^3$, $R^4$ and $R^5$ is an aliphatic group chosen from alkyl groups and alkenyl groups. Examples include $C_1$ to $C_{20}$ alkyl and alkenyl groups, such as methyl, ethyl, propyl, butyl, ethenyl, propenyl and butenyl groups. In addition to or in the alternative, the aliphatic groups can also be chosen from alkyl hydroxyl groups, such as —CH$_3$OH and —C$_2$H$_5$OH groups; R$^6$OR$^7$ groups, such as ethoxyethyl; aldehyde groups having a general formula R$^6$CHO, and ketone groups having formulae R$^6$COR$^7$, where $R^6$ and $R^7$ are independently chosen from aliphatic groups, such as saturated or unsaturated, linear or branched hydrocarbons. In an embodiment, $R^3$, $R^4$ and $R^5$ are all independently chosen from $C_1$ to $C_{20}$ aliphatic groups.

In an embodiment, the organic amine base can be chosen from alkylamines, such as dialkylamines and trialkylamines. Examples of dialkylamines include compounds of the formula R$^8$R$^9$NH, where $R^8$ and $R^9$ are independently chosen from $C_1$ to $C_6$ alkyls. Example compounds include dimethylamine and diethylamine. Example trialkylamines include trimethylamine and triethylamine.

In an embodiment, the organic amine base can be chosen from amine compounds of the formula R$^{10}$NR$^{11}$$_2$ and R$^{10}$$_2$NR$^{11}$, where $R^{10}$ is a fatty acid and $R^{11}$ is chosen from a hydrogen atom, alkyl groups and polyoxyalkylene groups. An example of these compounds is N-Coco-N,N-dimethyl amine.

In an embodiment, the organic amine base can be chosen from amine compounds of the formulae: R$^8$$_2$NOH, (HOR$^9$)$_2$NR$^8$ or N(R$^9$OH)$_3$, where $R^8$ and $R^9$ are independently chosen from $C_1$ to $C_6$ hydrocarbon moieties. Suitable examples of these compounds include (C$_2$H$_5$)$_2$NOH, (HOC$_2$H$_4$)$_2$NCH$_3$ and N(C$_2$H$_4$OH)$_3$.

In an embodiment, the amine is a polyamine. Suitable polyamine compounds include those of formula 2 above, where at least one of $R^3$, $R^4$ and $R^5$ are chosen to be aliphatic groups comprising at least one amine functional group. The amine functional group can be a primary, secondary or tertiary amine group.

In an embodiment, the organic amine base is a polyamine of the general formula R$^{12}$R$^{13}$NR$^{14}$NR$^{15}$R$^{16}$, where $R^{14}$ is chosen from substituted or unsubstituted alkylgroups, substituted or unsubstituted ether groups and substituted or unsubstituted polyether groups; and R$^{12}$, R$^{13}$, R$^{15}$ and R$^{16}$ are each bonded to a nitrogen atom and are independently chosen from a hydrogen atom, fatty acids, esters of fatty acids, hydroxyl alkyl groups, polyoxyalkylene groups and $C_1$ to $C_{40}$ alkyls. Examples of such polyamines include Bis-(2-dimethylaminoethyl)ether; ethoxylated tallow alkyl diamines, such as N,N'N'-polyoxyethylene(15)-N-tallowalkyl-1,3-diaminopropane; polyoxyalkylenediamines, such as polyoxypropylenediamine, N,N'-bis(2-propyl)polyoxypropylenediamine and Me$_2$N(CH$_2$)$_2$(OCH$_2$CH$_2$)$_2$NMe$_2$.

Examples of commercially available bases suitable for use in the compositions of the present disclosure include JEFFAMINE® D-230, JEFFAMINE SD-231, JEFFCAT® ZF-20 and JEFFCAT E-40, all available from Huntsman LLC, located in the Woodlands, Tex.; and ETHOMEEN®

T/15 and ETHODUOMEEN® T/25, both available from AkzoNobel, located in Amsterdam, The Netherlands.

Aqueous Base Solvent

Any suitable aqueous base solvent can be employed. Examples of suitable aqueous based solvents include fresh water, seawater, brine, produced water and combinations thereof.

The brine may be any brine that serves as a suitable media for the various components. As a matter of convenience, in some cases the brine base fluid may be the brine available at the site used in the well servicing fluid, for example. The brines may be prepared using inorganic salts including, but not limited to, NaCl, KCl, $CaCl_2$, $MgCl_2$, $NH_4Cl$, $CaBr_2$, NaBr, $ZnBr_2$ and any other stimulation and/or completion brine inorganic salts. In an embodiment, the brine is seawater.

The concentration of the inorganic salts in the brines can range from about 0.5% by weight based on the total weight of the brine up to saturation for a given salt. Example concentrations of inorganic salts include 2%, 10%, 20%, and 30% salt by weight or more based on the total weight of the brine. The brine may be a combination of one or more of the mentioned inorganic salts, such as, for example, a brine prepared using NaCl and $CaCl_2$ or NaCl, $CaCl_2$, and $CaBr_2$. The inorganic salt can be added at any time during the preparation of the well servicing fluid.

Additional Thermodynamic Hydrate Inhibitors

In addition to the organic salts of the present disclosure, other thermodynamic hydrate inhibitors (THIs) can be included in the well fluids of the present disclosure. Any suitable THIs can be used. Examples of suitable THIs include inorganic salts, such as sodium chloride and any of the other inorganic salts herein, including those used for preparing brines, as discussed above. Other suitable THIs include alcohols and alcohol ethers, such as methanol; ethanol; glycols, such as ethylene glycol, propylene glycol; glycol ethers and polyglycols.

The concentration of an additional THI in the well fluids of the present disclosure will vary depending on the type of THI used, the desired density of the well fluid and the acceptable hydrate suppression of the fluid. Example concentrations of the additional THIs can range from about 5% by weight to about 40% by weight, such as about 10% or about 20% by weight, based on the total weight of the well fluid.

Other Ingredients

Other ingredients that can be employed include pH adjusters (e.g., buffers), breakers, non-emulsifiers, viscosifying agents, surfactants, clay stabilization additives, biopolymer degradation additives, fluid loss control additives, high temperature stabilizers and any other suitable additives. The other ingredients that are chosen for any given formulation will depend on a variety of factors, and one of ordinary skill in the art would be able to readily choose the other ingredients when formulating the well servicing fluids of the present disclosure.

Well Servicing Fluid

The resulting well servicing fluids comprise the organic salts of the present disclosure in solution in the aqueous based solvent. The organic salts can be formed by any available reaction mechanism between the organic acids and organic amine bases described herein. An exemplary reaction product formed from the organic acids of formula 1 and the bases of formula 2 above is shown by formula 3 below:

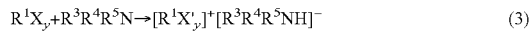

(3)

where $R^1$, $R^3$, $R^4$, $R^5$, X and y are defined as set forth in the description of formulae 1 and 2 above, and X' is the same as the X moiety of formula 1 without the hydrogen atom bonded to the X moiety's hydroxyl group.

The well servicing fluids can be used, for example, as completion fluids or packer fluids in hydrocarbon producing wells. The density of the fluid can be any desired density and will vary with the concentration of the organic salt. Densities for a 30% by weight organic salt solution in water can range, for example, from about 0.85 g/ml to about 1.15 g/ml, such as about 0.95 g/ml to about 1.05 g/ml. In an embodiment, the organic salt can form an aqueous solution that has a hydrate inhibiting effect that is greater than a $CaCl_2$ aqueous solution of the same density.

The concentration of organic salt in the well servicing fluid can be chosen to arrive at a desired density and hydrate inhibiting efficiency. For example, the concentration of organic salt can range from 10% by weight or more, such as about 20% by weight to about 50% by weight, based on the total weight of the well servicing fluid. In an embodiment where both inorganic and organic salts are employed, the well servicing fluid can comprise salt concentrations ranging from, for example, about 10% to about 30% by weight inorganic salt, and about 10% to about 30% by weight organic salt.

Method

A method of servicing a well with the above described fluids is also disclosed. The method comprises providing a well servicing fluid, the well servicing fluid comprising: an organic salt, the organic salt being the product of an organic acid and an organic amine base; and an aqueous based solvent, the organic salt and the aqueous based solvent forming an organic salt solution. Any of the organic acids and organic amine bases discussed herein above for forming the organic salts can be employed.

The organic salt can be formed in situ by mixing the organic acid and organic amine base directly with the aqueous based solvent to form the well servicing fluid. This can be performed at the well site, either prior to or simultaneously with introducing the well servicing fluid into the well. In this embodiment, the acid and base react in the aqueous based solvent to form the desired organic salt. Any suitable aqueous based solvent, as discussed herein, can be employed.

Alternatively, the acid and base can first be reacted together to form the organic salt prior to combining the salt with the aqueous based solvent. The salt formation can occur in any suitable manner, such as by reacting the acid and base in an aqueous phase. If desired, the resulting salt solution can be dehydrated to form a dry organic salt compound. The dry organic salt can then be introduced into the aqueous based solvent either prior to or simultaneously with introducing the well servicing fluid into the well.

In an embodiment, the organic salts reduce the formation of hydrates in the subsea well compared with the amount of hydrates that would have formed in the same well servicing fluid without the organic salt. Because the well servicing fluids can be formed to have relatively low densities, the fluids can also potentially be suitably balanced with the well formation pressures.

The fluids described herein can be used as completion fluids and packer fluids. It is also expected that the fluids of the present disclosure will find utility in fluid loss pills, lost circulation pills, diverter fluids, foamed fluids, stimulation fluids and the like.

The present disclosure will be further described with respect to the following Examples, which are not meant to limit the invention, but rather to further illustrate the various embodiments.

EXAMPLES

The following examples were formulated as described below and as shown in Table 1. The amounts of base and acid shown were reacted in water to produce a salt solution. Water quantity was adjusted so that the final concentration of salt was 20-50% by weight relative to the total weight of the final solution.

TABLE 1

Produced Salts

| Salt designator | Acid | Base | Acid/Base molar ratio | Concentration in water, % | Density @ 70° F. d, g/ml |
|---|---|---|---|---|---|
| A | Acetic | Me$_2$NH | 1:1 | 30 | 1.0189 |
| B | Acetic | N-Coco-N,N-dimethyl amine[a] | 1:1 | 20 | 0.9784 |
|   |        |                              |     | 30 | 0.9693 |
| C | Acetic | Ethomeen T/15[a] | 1:1 | 20 | 0.9957 |
|   |        |                  |     | 30 | 0.9835 |
| D | Acetic | Ethoduomeen T/25[a] | 1:1 | 20 | 1.0147 |
| E | Propionic | Me$_2$NH | 1:1 | 20 | 1.0100 |
|   |           |          |     | 30 | 1.0153 |
|   |           |          |     | 40 | 1.0205 |
|   |           |          |     | 50 | 1.0210 |
| F | Propionic | Et$_2$NH | 1:1 | 20 | 1.0046 |
| G | Propionic | Et$_2$NOH | 1:1 | 20 | 1.0105 |
|   |           |           |     | 30 | 1.014 |
| H | Propionic | (HOC$_2$H$_4$)$_2$NMe | 1:1 | 20 | 1.0302 |
| I | Propionic | N(C$_2$H$_4$OH)$_3$ | 1:1 | 20 | 1.0417 |
| J | Propionic | Jeffcat ZF-20[b] | 1.1:1 | 20 | 1.0089 |
|   |           |                  |       | 30 | 1.0173 |
| K | Propionic | Jeffcat E-40[b] | 1.05:1 | 30 | 1.0331 |
| L | Propionic | Jeffamine D-230[a] | 1:1 | 20 | 1.0116 |
| M | Propionic | Jeffamine SD-231[b] | 2:1 | 20 | 1.0066 |
|   |           |                     |     | 30 | 1.0166 |
| N | Propionic | N-Coco-N,N-dimethyl amine[a] | 1:1 | 20 | 0.9863 |
|   |           |                              |     | 30 | 0.9689 |
| O | Propionic | Ethomeen T/15[a] | 1:1 | 30 | 0.9967 |
| P | Citric | Me$_2$NH | 2:1 | 30 | 1.0817 |
|   |        |          |     | 40 | 1.1137 |
| Q | DDBSA[c] | Me$_2$NH | 1:1 | 10 | 0.9976 |

[a]Available from AKZO.
[b]Available from Huntsman Chemicals.
[c]Dodecylbenzenosulfonic acid - salt too viscous to consider at concentration over 10%.

Performance Testing

Salts A through Q were tested for their efficiency as thermodynamic hydrate inhibitors in a 10,000 psi Rocking Cell testing device. The Rocking Cell was a high pressure cell that was rocked from side to side at approximately one cycle per minute. A ball inside the Rocking Cell rolled back and forth from one end to the other. The movement of the ball was detected by proximity sensors. The Rocking Cell tube was equipped with an inlet/outlet for the gas and sample fluid, as well as temperature and pressure sensors. If solid hydrate formed at testing conditions, the ball movement was blocked and movement of the ball was no longer detected. Hydrate formation also consumed gas, resulting in a decrease of pressure inside the cell at constant temperature.

The 50 ml of each solution being tested was placed in a 100 ml volume rocking cell at 25° C. The rocking cell was then pressurized to about 9,000 psi in a gas of about 98% methane, 2% ethane; and cooled slowly to 0° C. in 5 hours and kept at 0° C. for about 10 more hours. These conditions were sufficient to produce solid gas hydrate indicated by a continuous pressure drop at 0° C., which in turn cause movement of the ball inside the cell to cease. Then, the cell was reheated back to 25° C. in 5 hours.

Cooling and heating cycle curves depicting pressure versus temperature were graphed. A thermodynamic equilibrium point at p/T conditions was determined by the point of intersection of the heating curve with the cooling curve. After lowering the gas pressure by about 500 psi, the cycle was repeated a couple of more times to collect more data points. FIG. 1 shows heating and cooling curve data for a 30% by weight salt solution formed from acetic acid and dimethylamine. The hydrate melting/thermodynamic equilibrium point is at 10 in FIG. 1. The hydrate started forming at about 20 on the cooling curve.

Because no known hydrate simulation software is capable of directly calculating hydrate suppression efficiency of reported compounds, the experimentally determined equilibrium points discussed above were used to simulate a concentration of CaCl$_2$ in water best fitting the experimental results. For example, a solution of salt E at 30% in water suppressed hydrates as efficiently as a 20% solution of calcium chloride. This E solution was assigned a 20% CaCl$_2$ equivalent, as shown in Table 2 below. Calcium chloride was a convenient reference due to its high solubility in water. Any commonly used hydrate inhibiting salt (e.g., NaCl, KCl) could also have been used for comparison instead of CaCl$_2$.

Specific gravities of reported organic salts and equivalent CaCl$_2$ solution were also compared to determine how much lighter of a fluid can be formulated with the compounds A-Q relative to a CaCl$_2$ solution having the same hydrate inhibiting effect. The results were collected in Table 2. The last column of Table 2 shows Δp values, which indicate how much less pressure the organic salt solution would impose downhole per 1000 ft of vertical tubing. This is a direct indicator of improved efficiency achieved by the reported organic salts over a CaCl$_2$ solution having the same hydrate inhibiting effect.

Results in Tables 1 and 2 indicate that high molecular weight amines from Akzo produce low density salt solutions (B, C, D, N, O); however, their hydrate suppression efficiency makes them relatively less attractive hydrate inhibitors (low CaCl$_2$ percent equivalent) compared to some of the other organic salts tested. Salts made with Huntsman amines (J, K, L, M) are only slightly heavier than water and are better thermodynamic hydrate inhibitors (THI). Better THI performance offsets the higher density. Nevertheless, the Δp value remains below 60 psi/1000 ft of more vertical tubing.

TABLE 2

Hydrate suppression efficiency of organic salts and comparison to equivalent solutions of calcium chloride

| Salt designator | Concentration in water, (% by weight) | % by weight CaCl$_2$ equivalent | Equivalent CaCl$_2$ solution density, d, g/ml | dCaCl$_2$-d salt Δd, g/ml | Less pressure per 1000 ft, Δp, psi |
|---|---|---|---|---|---|
| A | 30 | 21.1 | 1.19 | 0.1711 | 74 |
| B | 30 | 7.3 | 1.069 | 0.0997 | 43 |
| C | 30 | 6.9 | 1.063 | 0.0795 | 34 |
| D | 20 | 4.6 | 1.064 | 0.0493 | 21 |
| E | 20 | 14.5 | 1.129 | 0.119 | 52 |
|   | 30 | 20.0 | 1.180 | 0.1647 | 72 |
|   | 40 | 25.0 | 1.229 | 0.2085 | 91 |
|   | 50[a] | >30.0 | >1.280 | >0.2590 | >112 |
| F | 20 | 14.1 | 1.125 | 0.1204 | 52 |
| G | 20 | 10.0 | 1.090 | 0.0795 | 35 |
|   | 30 | 12.0 | 1.109 | 0.095 | 41 |
| H | 20 | 11.0 | 1.100 | 0.0698 | 30 |
| I | 20 | 11.0 | 1.100 | 0.583 | 25 |
| J | 20 | 10.0 | 1.090 | 0.0811 | 35 |
|   | 30 | 15.0 | 1.133 | 0.1157 | 50 |
| K | 30 | 14.1 | 1.125 | 0.0919 | 40 |
| L | 20 | 8.0 | 1.090 | 0.0536 | 23 |
| M | 20 | 10.0 | 1.090 | 0.0834 | 36 |
|   | 30 | 13.0 | 1.115 | 0.0984 | 43 |
| N | 20 | 4.0 | 1.039 | 0.0527 | 23 |

TABLE 2-continued

Hydrate suppression efficiency of organic salts and comparison to equivalent solutions of calcium chloride

| Salt designator | Concentration in water, (% by weight) | % by weight CaCl$_2$ equivalent | Equivalent CaCl$_2$ solution density, d, g/ml | dCaCl$_2$-d salt Δd, g/ml | Less pressure per 1000 ft, Δp, psi |
|---|---|---|---|---|---|
|  | 30 | 5.3 | 1.044 | 0.0751 | 33 |
| O | 30 | 5.2 | 1.050 | 0.0533 | 23 |
| P | 30 | 13.0 | 1.115 | 0.0333 | 15 |
|  | 40 | 16.0 | 1.141 | 0.0273 | 12 |
| Q | 10 | 4.6 | 1.041 | 0.0434 | 19 |
| E + NaCl[b] | 20 + 10 | 22.0 | 1.198 | 0.1212 | 53 |
| E + EG[c] | 20 + 10 | 18.2 | 1.162 | 0.139 | 60 |

[a]This solution never formed hydrates even after being kept for two days at −5° C. @ 9000 psi.
[b]Total concentration 30%, density @ 21° C. = 1.0768 g/ml
[c]Total concentration 30%, density @ 21° C. = 1.023 m/ml Surprisingly, the low molecular weight amines reacted with acetic or propionic acid to form relatively low density salt solutions that exhibited good THI properties (A, E, F). Dimethyl amine acetate and propionate have superior solubility in water. In addition, the solutions were good thermodynamic hydrate inhibitors and had relatively low viscosity. For example, Product E at 50% provided excellent protection from hydrates and a low formation pressure of less than 112 psi/1000 ft. That is approximately 1120 psi less pressure in a 10,000 ft well. Dimethyl amine citrate (P) was not as good a THI as some of the other organic salts tested, although like all the organic salt solutions tested, it showed some improvement over the CaCl$_2$ reference solution. The dodecylbenzenosulfonate (Q) solution formed a relatively light aqueous salt solution, but was too viscous for consideration at concentrations over 10%.

The last two experiments reported in Table 2 were for two inhibitor combinations, namely salt E (20%)/NaCl (10%) and salt E (20%)/ethylene glycol (EG) (10%). Both experiments showed that organic salt THI are compatible and can be mixed with common "classic" THI inorganic salts and solvents. Using the organic salts in combination with other THI additives could be an attractive alternative in a process of formulating a fluid having specific density and hydrate resistance.

These results show that relatively low density, hydrate resistant well servicing fluids can be formulated with at least one thermodynamic hydrate inhibitor being a reaction product between an amine base and organic acid in water. The formula can also contain other thermodynamic hydrate inhibitors, such as a mixture of THI composed of inorganic salts and organic solvents. The light weight fluid would be effective in the inhibition and/or suppression of the formation and growth of gas hydrates in media susceptible to gas hydrate formations, especially in deepwater gas/oil wells.

Although various embodiments have been shown and described, the present disclosure is not so limited and will be understood to include all such modifications and variations as would be apparent to one skilled in the art.

What is claimed is:

1. A well servicing fluid comprising:
   an organic salt, the organic salt being the product of an organic acid and an organic amine base; and
   an aqueous based solvent, the organic salt and the aqueous based solvent forming an organic salt solution.

2. The fluid of claim 1, wherein aqueous based solvent chosen from fresh water, brine, seawater and produced water.

3. The fluid of claim 2, wherein the aqueous based solvent is a brine comprising a concentration of inorganic salt of 0.5% by weight or more, based on the total weight of the brine.

4. The fluid of claim 1, wherein the concentration of organic salt is about 10% by weight or more, based on the total weight of the well servicing fluid.

5. The fluid of claim 4, further comprising an inorganic salt in a concentration of about 10% by weight or more, based on the total weight of the well servicing fluid.

6. The fluid of claim 1, wherein the organic amine base is chosen from the compounds of formula 2:

$$R^3R^4R^5N \qquad (2)$$

where $R^3$, $R^4$ and $R^5$ are chosen from hydrogen atoms, hydroxyl groups, and substituted or unsubstituted aliphatic groups, with the proviso that at least one of $R^3$, $R^4$ and $R^5$ is an aliphatic group comprising from 1 to 40 carbons.

7. The fluid of claim 6, wherein the at least one aliphatic group is chosen from alkyl groups, alkenyl groups, alkyl hydroxyl groups, —$R^6OR^7$ groups, —$R^6CHO$ groups, and —$R^6COR^7$ groups, where $R^6$ and $R^7$ are independently chosen from aliphatic groups.

8. The fluid of claim 6, wherein $R^3$, $R^4$ and $R^5$ are all $C_1$ to $C_{20}$ aliphatic groups.

9. The fluid of claim 6, wherein the amine base is a polyamine and the at least one aliphatic group is chosen from primary, secondary or tertiary aliphatic amine groups.

10. The fluid of claim 1, wherein the amine is chosen from dimethylamine; diethylamine; trimethylamine; triethylamine; N-Coco-N,N-dimethyl amine; Bis-(2-dimethylaminoethyl)ether; polyoxyalkylenediamines; ethoxylated tallow alkyl amines; $(C_2H_5)_2NOH$; $(HOC_2H_4)_2NCH_3$ and $N(C_2H_4OH)_3$.

11. The fluid of claim 10, wherein the amine is chosen from N,N'N'-polyoxyethylene(15)-N-tallowalkyl-1,3-diaminopropane, polyoxypropylenediamine and N,N'-bis(2-propyl)polyoxypropylenediamine.

12. The fluid of claim 1, wherein the organic acid is chosen from oxoacids of carbon, oxoacids of sulfur and oxoacids of phosphorus.

13. The fluid of claim 1, wherein the organic acid is chosen from the compounds of formula 1:

$$R^1X_y \qquad (1)$$

wherein:
$R^1$ is chosen from substituted or unsubstituted aliphatic groups and substituted or unsubstituted aromatic groups;
X is chosen from —C(=O)OH, —OS(=O)$_2$OH, —S(=O)$_2$OH, —OP(=O)(OR$^2$)OH, —P(=O)(OR$^2$)OH, and —P(=O)OHR$^2$, where $R^2$ is chosen from hydrogen atoms, substituted or unsubstituted aliphatic groups and substituted or unsubstituted aromatic groups; and
y is 1 to 4.

14. The fluid of claim 1, wherein the organic acid is chosen from carboxylic acids, sulfonic acids, sulfuric acids, phosphoric acids, phosphonic acids, and phosphinic acids.

15. The fluid of claim 1, wherein the organic acid is chosen from propionic acid, acetic acid, propanedioic acid, ethanedioic, succinic acid, maleic acid and dodecylbenzenesulfonic acid.

16. The fluid of claim 1, wherein the amine is chosen from $R^8R^9NH$, where $R^8$ and $R^9$ are independently chosen from $C_1$ to $C_6$ alkyls; $R^{10}NR^{11}_2$ and $R^{10}_2NR^{11}$, where $R^{10}$ is a fatty acid and $R^{11}$ is chosen from a hydrogen atom, alkyl groups and polyoxyalkylene groups; $R^8_2NOH$, $(HOR^9)_2NR^8$ and $N(R^9OH)_3$, where $R^8$ and $R^9$ are independently chosen from $C_1$ to $C_6$ hydrocarbon moieties; polyamines with the general formula $R^{12}R^{13}NR^{14}NR^{15}R^{16}$, where $R^{14}$ is chosen from substituted for unsubstituted alkyl groups, substituted or unsubstituted ether groups and substituted or unsubstituted polyether groups, and $R^{12}$, $R^{13}$, $R^{15}$ and $R^{16}$ are each bonded to a nitrogen atom and are independently chosen from a hydrogen atom, fatty acids, esters of fatty acids, hydroxyl alkyl groups, polyoxyalkylene groups and $C_1$ to $C_{40}$ alkyls.

17. The fluid of claim 1, wherein the acid is a carboxylic acid and the base is a dialkylamine.

18. The fluid of claim 1, wherein the fluid is formulated with at least one additional compound chosen from non-emulsifiers, viscosifying agents, surfactants, clay stabilization additives, biopolymer degradation additives, fluid loss control additives and high temperature stabilizers.

19. A method of servicing a well, the method comprising:
providing a well servicing fluid comprising:
an organic salt, the organic salt being the product of an organic acid and an organic amine base; and
an aqueous based solvent, the organic salt and the aqueous based solvent forming an organic salt solution; and
introducing the well servicing fluid into a well.

20. The method of claim 19, wherein the concentration of organic salt is about 10% by weight or more, based on the total weight of the well servicing fluid.

21. The method of claim 20, further comprising an inorganic salt in a concentration of about 10% by weight or more, based on the total weight of the well servicing fluid.

22. The method of claim 19, wherein the organic amine base is chosen from the compounds of formula 2:

$$R^3R^4R^5N \qquad (2)$$

where $R^3$, $R^4$ and $R^5$ are chosen from hydrogen atoms, hydroxyl groups, and substituted or unsubstituted aliphatic groups, with the proviso that at least one of $R^3$, $R^4$ and $R^5$ is an aliphatic group comprising from 1 to 40 carbons.

23. The method of claim 22, wherein the aliphatic group is chosen from alkyl groups, alkenyl groups, alkyl hydroxyl groups, —$R^6OR^7$ groups, —$R^6CHO$ groups, and —$R^6COR^7$ groups, where $R^6$ and $R^7$ are independently chosen from aliphatic groups.

24. The method of claim 22, wherein the amine base is a polyamine and the at least one aliphatic group is chosen from primary, secondary or tertiary aliphatic amine groups.

25. The method of claim 19, wherein the amine is chosen from dimethylamine; diethylamine; trimethylamine; triethylamine; N-Coco-N,N-dimethyl amine; Bis-(2-dimethylaminoethyl)ether; polyoxyalkylenediamines; ethoxylated tallow alkyl amines; $(C_2H_5)_2NOH$; $(HOC_2H_4)_2NCH_3$ and $N(C_2H_4OH)_3$.

26. The method of claim 25, wherein the amine is chosen from N,N'N'-polyoxyethylene(15)-N-tallowalkyl-1,3-diaminopropane, polyoxypropylenediamine and N,N'-bis(2-propyl)polyoxypropylenediamine.

27. The method of claim 19, wherein aqueous based solvent is chosen from fresh water, brine, seawater and produced water.

28. The method of claim 19, wherein the aqueous based solvent is a brine comprising a concentration of inorganic salt of 0.5% by weight or more, based on the total weight of the brine.

29. The method of claim 19, wherein the organic acid is chosen from oxoacids of carbon, oxoacids of sulfur and oxoacids of phosphorus.

30. The method of claim 19, wherein the organic acid is chosen from the compounds of formula 1:

$$R^1X_y \qquad (1)$$

wherein:
$R^1$ is chosen from substituted or unsubstituted aliphatic groups and substituted or unsubstituted aromatic groups;
X is chosen from —C(=O)OH, —OS(=O)$_2$OH, —S(=O)$_2$OH, —OP(=O)(OR$^2$)OH, —P(=O)(OR$^2$)OH, and —P(=O)OHR$^2$, where $R^2$ is chosen from hydrogen atoms, substituted or unsubstituted aliphatic groups and substituted or unsubstituted aromatic groups; and
y is 1 to 4.

31. The method of claim 19, wherein the organic acid is chosen from carboxylic acids, sulfonic acids, sulfuric acids, phosphoric acids, phosphonic acids, and phosphinic acids.

32. The method of claim 19, wherein the organic acid is chosen from propionic acid, acetic acid, propanedioic acid, ethanedioic, succinic acid, maleic acid and dodecylbenzenesulfonic acid.

33. The method of claim 19, wherein the amine is chosen from $R^8R^9NH$, where $R^8$ and $R^9$ are independently chosen from $C_1$ to $C_6$ alkyls; $R^{10}NR^{11}_2$ and $R^{10}_2NR^{11}$, where $R^{10}$ is a fatty acid and $R^{11}$ is chosen from a hydrogen atom, alkyl groups and polyoxyalkylene groups; $R^8_2NOH$, $(HOR^9)_2NR^8$ and $N(R^9OH)_3$, where $R^8$ and $R^9$ are independently chosen from $C_1$ to $C_6$ hydrocarbon moieties; polyamines with the general formula $R^{12}R^{13}NR^{14}NR^{15}R^{16}$, where $R^{14}$ is chosen from substituted for unsubstituted alkyl groups, substituted or unsubstituted ether groups and substituted or unsubstituted polyether groups, and $R^{12}$, $R^{13}$, $R^{15}$ and $R^{16}$ are each bonded to a nitrogen atom and are independently chosen from a hydrogen atom, fatty acids, esters of fatty acids, hydroxyl alkyl groups, polyoxyalkylene groups and $C_1$ to $C_{40}$ alkyls.

34. The method of claim 19, wherein the acid is a carboxylic acid and the base is a dialkylamine.

35. The method of claim 19, wherein the fluid is formulated with at least one additional compound chosen from non-emulsifiers, viscosifying agents, surfactants, clay stabilization additives, biopolymer degradation additives, fluid loss control additives and high temperature stabilizers.

* * * * *